United States Patent
Huang et al.

(10) Patent No.: US 9,880,958 B2
(45) Date of Patent: Jan. 30, 2018

(54) EXTENSIBLE HOST CONTROLLER OF A HOST FOR OPTIONALLY CONTROLLING THE HOST TO ACT AS A TARGET SIDE OR A HOST SIDE AND RELATED OPERATION METHOD THEREOF

(71) Applicant: Etron Technology, Inc., Hsinchu (TW)

(72) Inventors: Cheng-Pin Huang, Taoyuan (TW); Hsuan-Ching Chao, Keelung (TW); Chih-Hung Huang, Taipei (TW)

(73) Assignee: eEver Technology, Inc., Taipei (TW)

( * ) Notice: Subject to any disclaimer, the term of this patent is extended or adjusted under 35 U.S.C. 154(b) by 150 days.

(21) Appl. No.: 14/874,466

(22) Filed: Oct. 4, 2015

(65) Prior Publication Data

US 2016/0098368 A1 Apr. 7, 2016

Related U.S. Application Data

(60) Provisional application No. 62/059,167, filed on Oct. 3, 2014.

(51) Int. Cl.
| | |
|---|---|
| *G06F 13/00* | (2006.01) |
| *G06F 13/362* | (2006.01) |
| *G06F 13/40* | (2006.01) |
| *G06F 13/42* | (2006.01) |

(52) U.S. Cl.
CPC ........ *G06F 13/362* (2013.01); *G06F 13/4068* (2013.01); *G06F 13/4286* (2013.01)

(58) Field of Classification Search
CPC . G06F 13/362; G06F 13/4068; G06F 13/4286
See application file for complete search history.

(56) References Cited

U.S. PATENT DOCUMENTS

| | | | | |
|---|---|---|---|---|
| 7,085,876 | B2* | 8/2006 | Lai ........................ | G06F 13/385 710/104 |
| 7,635,280 | B1* | 12/2009 | Crumlin ............. | H01R 13/7039 439/489 |
| 2004/0088449 | A1* | 5/2004 | Sakaki .................. | G06F 13/385 710/15 |

(Continued)

FOREIGN PATENT DOCUMENTS

| | | |
|---|---|---|
| CN | 101526930 A | 9/2009 |
| CN | 102301356 A | 12/2011 |

OTHER PUBLICATIONS

"eXtensible Host Controller Interface for Universal Serial Bus (xHCI)" Revision 1.0 by Intel, May 21, 2010, pp. 1-200.*

(Continued)

*Primary Examiner* — Jing-Yih Shyu
(74) *Attorney, Agent, or Firm* — Winston Hsu

(57) ABSTRACT

An extensible host controller applied to a host includes a universal serial bus (USB) module, a control unit, and a peripheral component interconnect express (PCIE) bus. The USB module includes a USB unit and a predetermined unit. The PCIE bus is coupled to the control unit, wherein the PCIE bus supports a USB mode and a predetermined mode. When a first host with a first extensible host controller is connected to the USB module, the control unit makes the host utilize the USB mode and the USB unit, or the predetermined mode and the predetermined unit to communicate with the first host according to a determination way.

26 Claims, 11 Drawing Sheets

(56) References Cited

U.S. PATENT DOCUMENTS

| | | | |
|---|---|---|---|
| 2004/0243755 A1* | 12/2004 | Lee | G06F 13/4081 710/311 |
| 2006/0123175 A1* | 6/2006 | Yu | G06F 13/4072 710/305 |
| 2007/0033308 A1* | 2/2007 | Teng | G06F 13/385 710/62 |
| 2008/0141259 A1* | 6/2008 | Tjia | G06F 9/5044 718/104 |
| 2010/0110305 A1* | 5/2010 | Chou | H04N 5/46 348/726 |
| 2010/0122021 A1* | 5/2010 | Lee | G06F 3/0613 711/103 |
| 2010/0169511 A1* | 7/2010 | Dunstan | G06F 13/4295 710/16 |
| 2013/0138860 A1* | 5/2013 | Moore | G06F 13/362 710/313 |
| 2013/0145052 A1* | 6/2013 | Aiken | G06F 9/4411 710/9 |
| 2013/0275640 A1* | 10/2013 | Wang | G06F 13/36 710/300 |
| 2014/0341110 A1* | 11/2014 | Sadeghi | G06F 13/385 370/328 |
| 2015/0220139 A1* | 8/2015 | Puthillathe | G06F 1/3293 713/323 |

OTHER PUBLICATIONS

"eXtensible Host Controller Interface for Universal Serial Bus (xHCI)" Revision 1.0 by Intel, May 21, 2010, pp. 201-468.*

* cited by examiner

EXTENSIBLE HOST CONTROLLER OF A HOST FOR OPTIONALLY CONTROLLING THE HOST TO ACT AS A TARGET SIDE OR A HOST SIDE AND RELATED OPERATION METHOD THEREOF

CROSS REFERENCE TO RELATED APPLICATIONS

This application claims the benefit of U.S. Provisional Application No. 62/059,167, filed on Oct. 3, 2014 and entitled "USB Super Speed host controller to share the data, video, and audio," the contents of which are incorporated herein by reference.

BACKGROUND OF THE INVENTION

1. Field of the Invention

The present invention relates to an extensible host controller and an operation method thereof, and particularly to an extensible host controller and an operation method thereof that can make a universal serial bus (USB) host communicate with another USB host through an ordinary USB transmission line.

2. Description of the Prior Art

The universal serial bus (USB) technique is an industry standard developed in mid-1990s that defines an external expansion bus which makes computer peripherals facilitate to connect to a host (e.g. a personal computer). Because the USB technique utilizes a master/slave architecture, a USB host controller of the host acts as a master role to send requests to a USB peripheral device (that is, a computer peripheral), and the USB peripheral device acts as a slave role to respond the requests from the host. The above mentioned master/slave roles are asymmetric and irreversible in a standard USB environment.

It is impossible to directly communicate between two hosts under the master/slave architecture except using an intermediate bridge device with both side slave interfaces. However, the intermediate bridge device is more expensive than an ordinary USB transmission line, and data transmission performance between the two hosts is limited due to indirect data transmission of the intermediate bridge device. Therefore, the intermediate bridge device is not proper to act as a communication Role between the two hosts.

SUMMARY OF THE INVENTION

An embodiment of the present invention provides an extensible host controller (xHC), wherein the extensible host controller is applied to a host. The extensible host controller includes a universal serial bus (USB) module, a control unit, and a peripheral component interconnect express (PCIE) bus. The USB module includes a USB unit and a predetermined unit. The PCIE bus is coupled to the control unit, wherein the PCIE bus supports a USB mode and a predetermined mode. When a first host with a first extensible host controller is connected to the USB module, the control unit makes the host utilize the USB mode and the USB unit, or the predetermined mode and the predetermined unit to communicate with the first host according to a determination way.

Another embodiment of the present invention provides an operation method of an extensible host controller, wherein the extensible host controller is applied to a host, and includes a USB module, a control unit, and a PCIE bus, wherein the USB module includes a USB unit and a predetermined unit, and the PCIE bus supports a USB mode and a predetermined mode. The operation method includes if the extensible host controller receiving first requests from a USB apparatus when the USB apparatus is connected to the USB module; the extensible host controller determining the USB apparatus is a USB host, and the host utilizing the predetermined mode and the predetermined unit to communicate with the USB apparatus when the extensible host controller receives the first requests; the extensible host controller issuing second requests to the USB apparatus when the extensible host controller does not receive the first requests; the extensible host controller determining the USB apparatus is a USB peripheral device, and the host utilizing the USB mode and the USB unit to communicate with the USB apparatus when the USB apparatus responds to the second requests; and the control unit making the host utilize the USB mode and the USB unit, or the predetermined mode and the predetermined unit to communicate with the USB apparatus according to a determination way when the USB apparatus does not respond to the second requests.

Another embodiment of the present invention provides an extensible host controller, wherein the extensible host controller is applied to a host. The extensible host controller includes a USB module, a control unit, and a PCIE bus. The USB module includes a USB unit and a predetermined unit. The PCIE bus is coupled to the control unit, wherein the PCIE bus supports a USB mode and a predetermined mode. When one of a first host with a first extensible host controller, a USB peripheral device, or a USB host is connected to the USB module, the control unit makes the host utilize the USB mode and the USB unit, or the predetermined mode and the predetermined unit to communicate with the one.

Another embodiment of the present invention provides an extensible host controller applied to a host, when one of a first host with a first extensible host controller, a USB peripheral device, or a USB host is connected to the host, the extensible host controller optionally controlling the host to act as a target side or a host side to communicate with the one The present invention provides an extensible host controller and an operation method thereof. Because the extensible host controller and the operation method can utilize a debug capability unit to respond requests issued from another USB host when the another USB host is connected to the extensible host controller, the extensible host controller and the operation method can directly utilize an ordinary USB transmission line to execute data transmission between the extensible host controller and the another USB host. Therefore, compared to the prior art, because the present invention can directly utilize the ordinary USB transmission line to execute data transmission between the extensible host controller and the another USB host, the present invention does not need an expensive intermediate bridge device to execute data transmission between the extensible host controller and the another USB host. In addition, data transmission performance of the present invention is better than the prior art due to direct data transmission between the extensible host controller and the another USB host.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
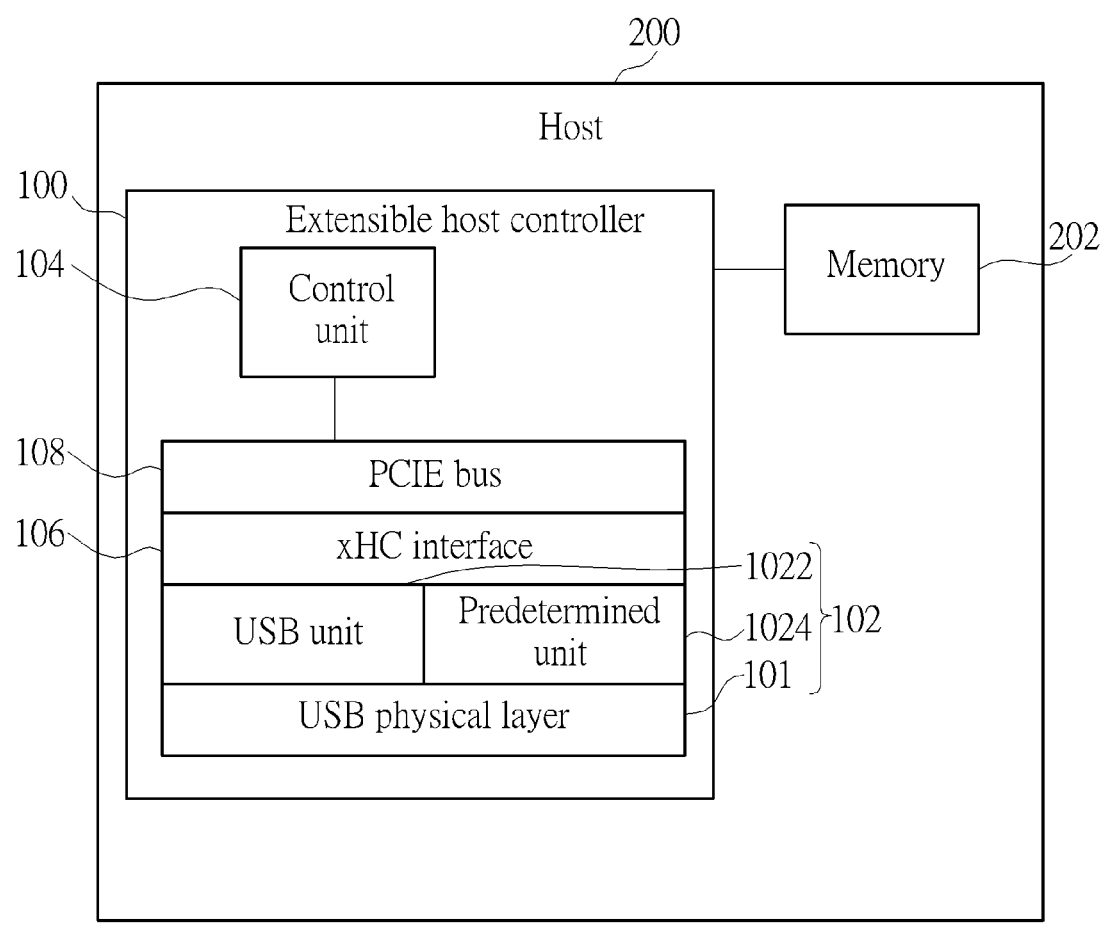
FIG. 1 is a diagram illustrating an extensible host controller according to a first embodiment of the present invention.

Please refer to FIG. 1. FIG. 1 is a diagram illustrating an extensible host controller (xHC) 100 according to a first embodiment of the present invention, wherein the extensible host controller 100 is applied to a host 200, and the extensible host controller 100 includes a universal serial bus (USB) module 102, a control unit 104, an xHC interface 106, and a peripheral component interconnect express (PCIE) bus 108, wherein the USB module 102 includes a USB physical layer 101, a USB unit 1022, and a predetermined unit 1024, and the USB module 102 is a USB 3.0 compatible module that can support USB 1.0, USB 1.1, USB 2.0, USB 3.0, and other USB 3.1 compatible standard specifications. In one embodiment of the present invention, the predetermined unit 1024 is a debug capability unit. As shown in FIG. 1, the USB unit 1022 and the predetermined unit 1024 are coupled to the xHC interface 106. But, in another embodiment of the present invention, the xHC interface 106 can be replaced with another predetermined interface, wherein the another predetermined interface needs to be able to support the USB unit 1022 and the predetermined unit 1024. As shown in FIG. 1, the PCIE bus 108 is coupled to the xHC interface 106 and the control unit 104, wherein the PCIE bus 108 can simultaneously support a USB mode and a predetermined mode, wherein the predetermined mode is a local area network mode.

Figure 2:
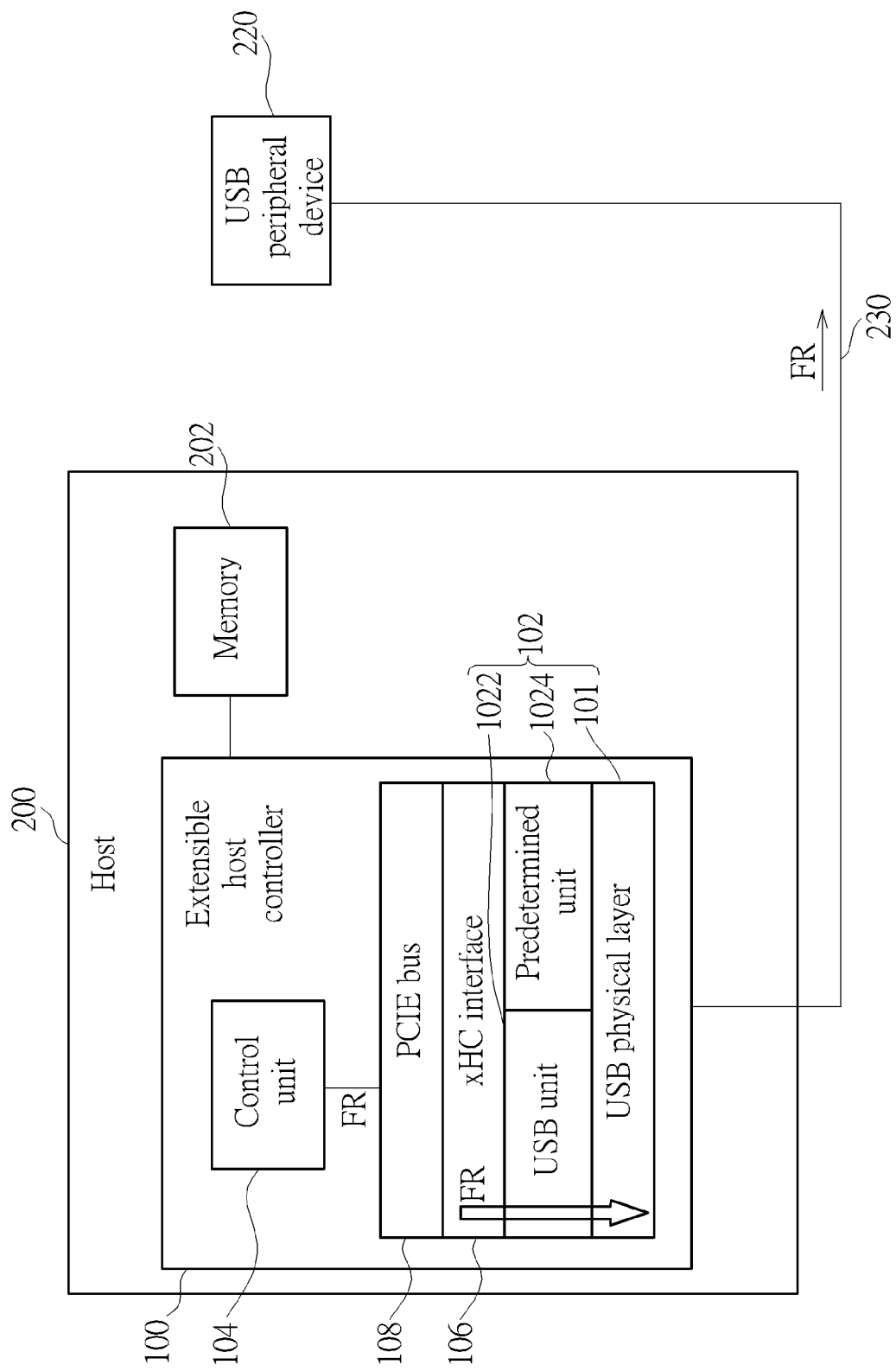
FIG. 2 is a diagram illustrating a USB peripheral device being connected to the host through the extensible host controller and an ordinary USB transmission line.

Please refer to FIG. 2. FIG. 2 is a diagram illustrating a USB peripheral device 220 being connected to the host 200 through the extensible host controller 100 and an ordinary USB transmission line 230 (e.g. a type A USB transmission line), wherein the USB peripheral device 220 can be a USB storage device, a USB flash device, a USB personal computer camera, and so on. As shown in FIG. 2, when the USB peripheral device 220 is connected to the host 200 through the extensible host controller 100 and the ordinary USB transmission line 230, the control unit 104 of the extensible host controller 100 can determine that the USB peripheral device 220 is a USB peripheral device (because the USB peripheral device 220 does not issue any request to the extensible host controller 100), so the extensible host controller 100 can act as a master role and the USB peripheral device 220 can act as a slave role, and a USB device driver built in the control unit 104 can ask an xHCI driver built in the control unit 104 to drive the xHC interface 106 to issue first requests FR to the USB peripheral device 220. That is to say, the first requests FR can be transmitted to the USB peripheral device 220 through the xHC interface 106, the USB unit 1022, and the USB physical layer 101. After the USB peripheral device 220 receives the first requests FR, the USB peripheral device 220 can respond to the first requests FR. Therefore, after the USB peripheral device 220 responds to the first requests FR, the host 200 can utilize the USB mode to communicate with the USB peripheral device 220. For example, the USB peripheral device 220 can transmit data to a memory 202 of the host 200 through the ordinary USB transmission line 230, the USB physical layer 101, the USB unit 1022, the xHC interface 106, and the PCIE bus 108. In addition, the host 200 can also transmit data stored in the memory 202 to the USB peripheral device 220 through the ordinary USB transmission line 230, the USB physical layer 101, the USB unit 1022, the xHC interface 106, and the PCIE bus 108.

Figure 3:
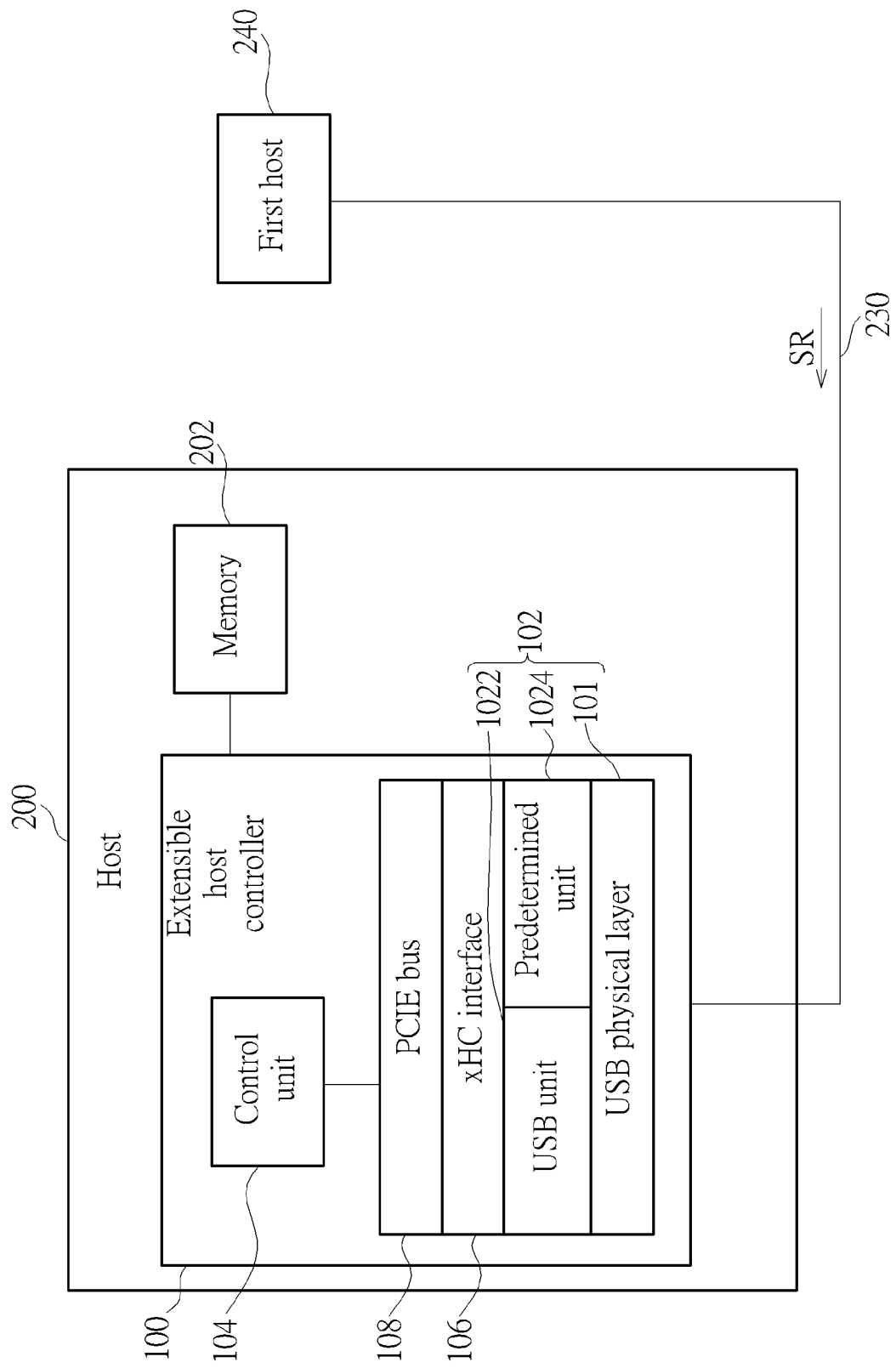
FIG. 3 is a diagram illustrating a first host being connected to the host through the extensible host controller and the ordinary USB transmission line.

Please refer to FIG. 3. FIG. 3 is a diagram illustrating a first host 240 being connected to the host 200 through the extensible host controller 100 and the ordinary USB transmission line 230. As shown in FIG. 3, when the first host 240 is connected to the host 200 through the extensible host controller 100 and the ordinary USB transmission line 230, the control unit 104 of the extensible host controller 100 can determine that the first host 240 is a USB host (because the first host 240 can issue second requests SR to the extensible host controller 100). According to the USB 3.0 compatible standard specification (e.g. USB 3.0 and other USB 3.1 compatible standard specifications), because the extensible host controller 100 has the debug capability unit (that is, the predetermined unit 1024), when the first host 240 issues the second requests SR to the extensible host controller 100, a predetermined driver built in the control unit 104 can drive the predetermined unit 1024 to respond to the second requests SR. Therefore, after the predetermined unit 1024 responds to the second requests SR, the host 200 can utilize the predetermined mode to communicate with the first host 240. For example, when the first host 240 is connected to the host 200, the control unit 104 can utilize a virtual network adapter (e.g. a 5 Gb Ethernet network driver built in the control unit 104) to simulate an Ethernet environment, so the first host 240 can utilize a network package way to transmit data to the memory 202 of the host 200 through the ordinary USB transmission line 230, the USB physical layer 101, the predetermined unit 1024, the xHC interface 106, and the PCIE bus 108. In addition, the host 200 can also utilize the network package way to transmit data stored in the memory 202 to the first host 240 through the ordinary USB transmission line 230, the USB physical layer 101, the predetermined unit 1024, the xHC interface 106, and the PCIE bus 108. In addition, when the first host 240 is connected to the host 200, the present invention is not limited to the first host 240 utilizing the network package way to communicate with the host 200. That is to say, when the first host 240 is connected to the host 200, the control unit 104 can utilize another driver to build a data transmission environment to let the first host 240 utilize another data transmission way to communicate with the host 200.

Figure 4:
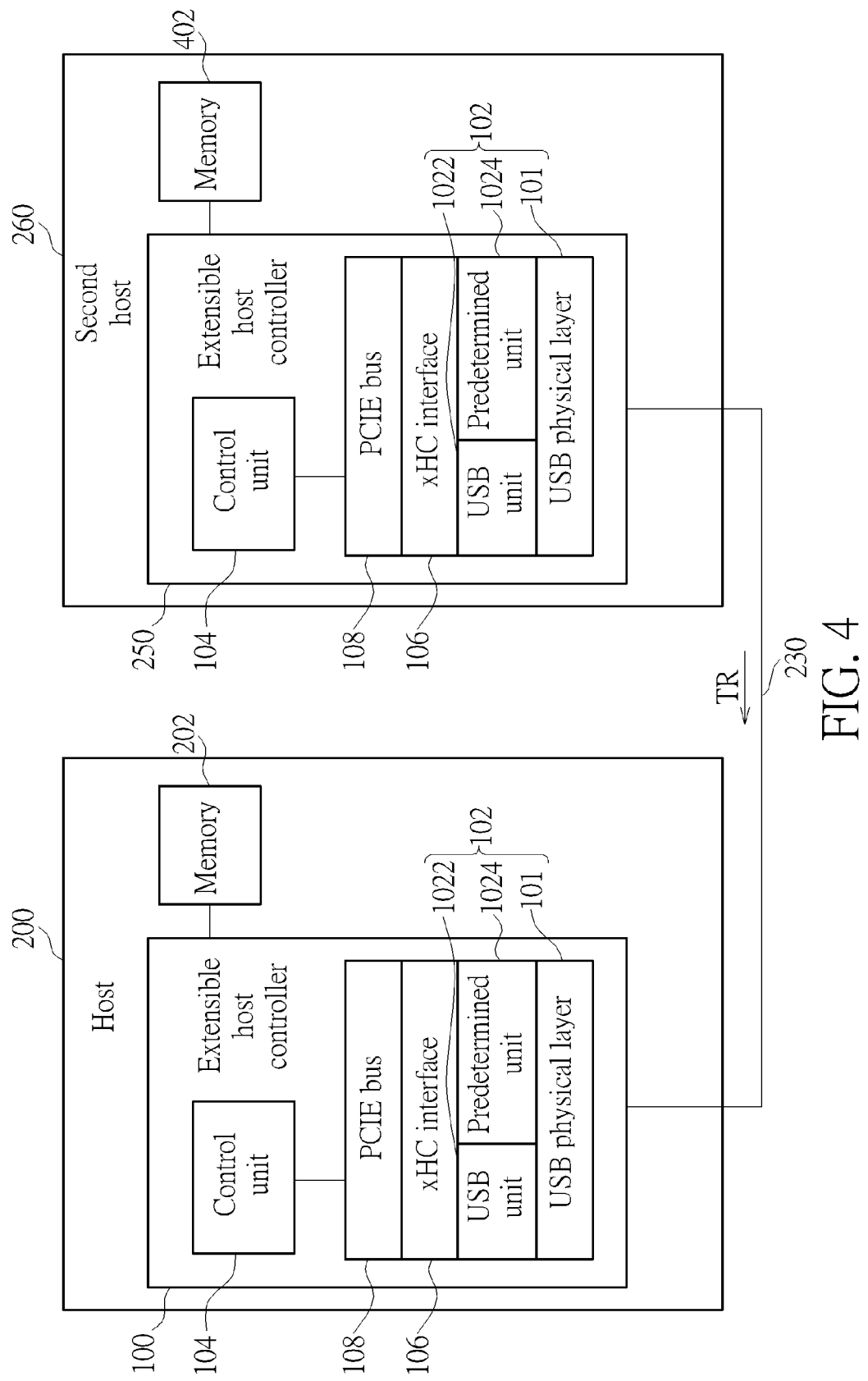
FIG. 4 is a diagram illustrating an extensible host controller being connected to the host through the extensible host controller and the ordinary USB transmission line.
Figure 5:
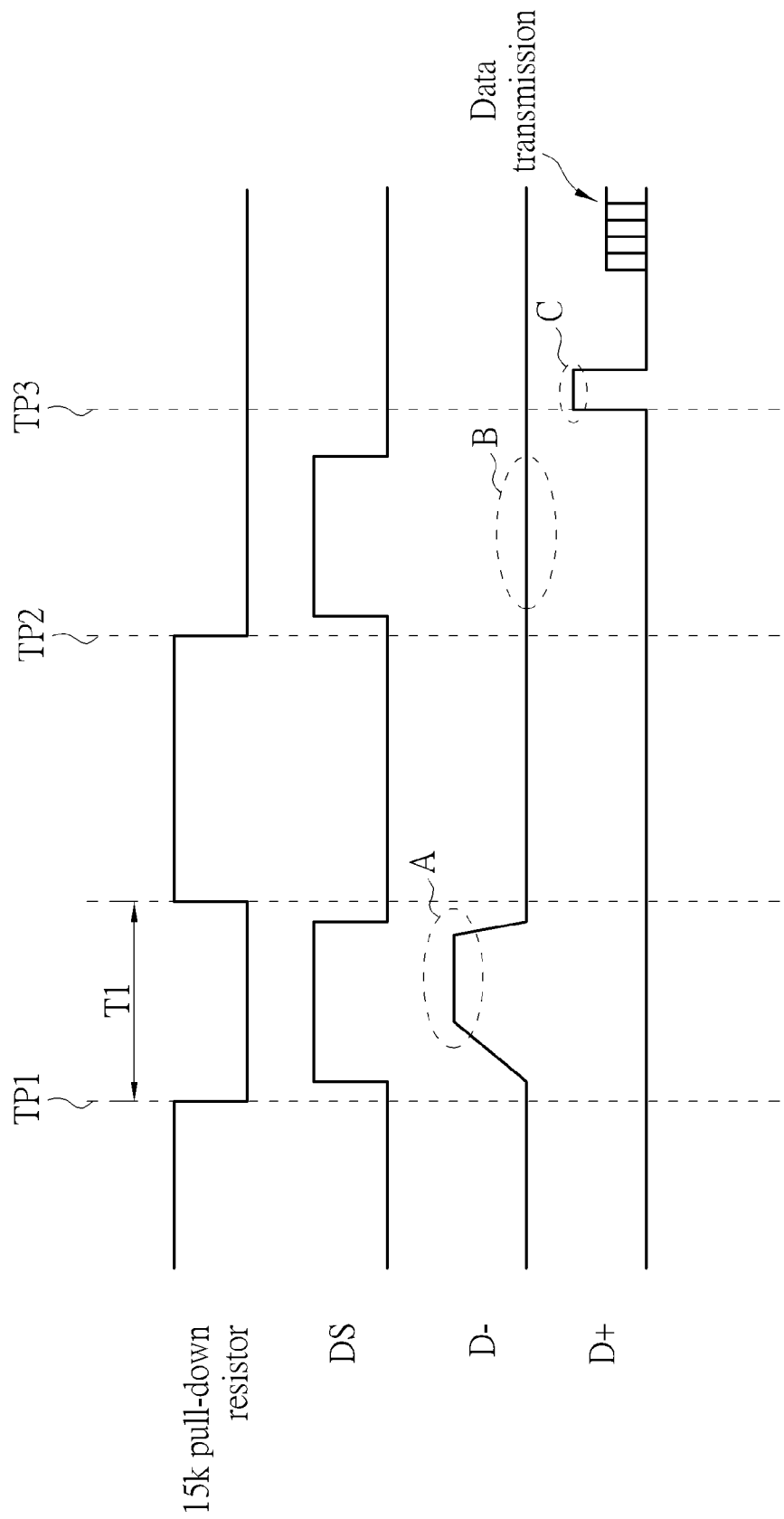
FIGS. 5, 6 are timing diagrams illustrating the extensible host controller detecting the extensible host controller.
Figure 6:
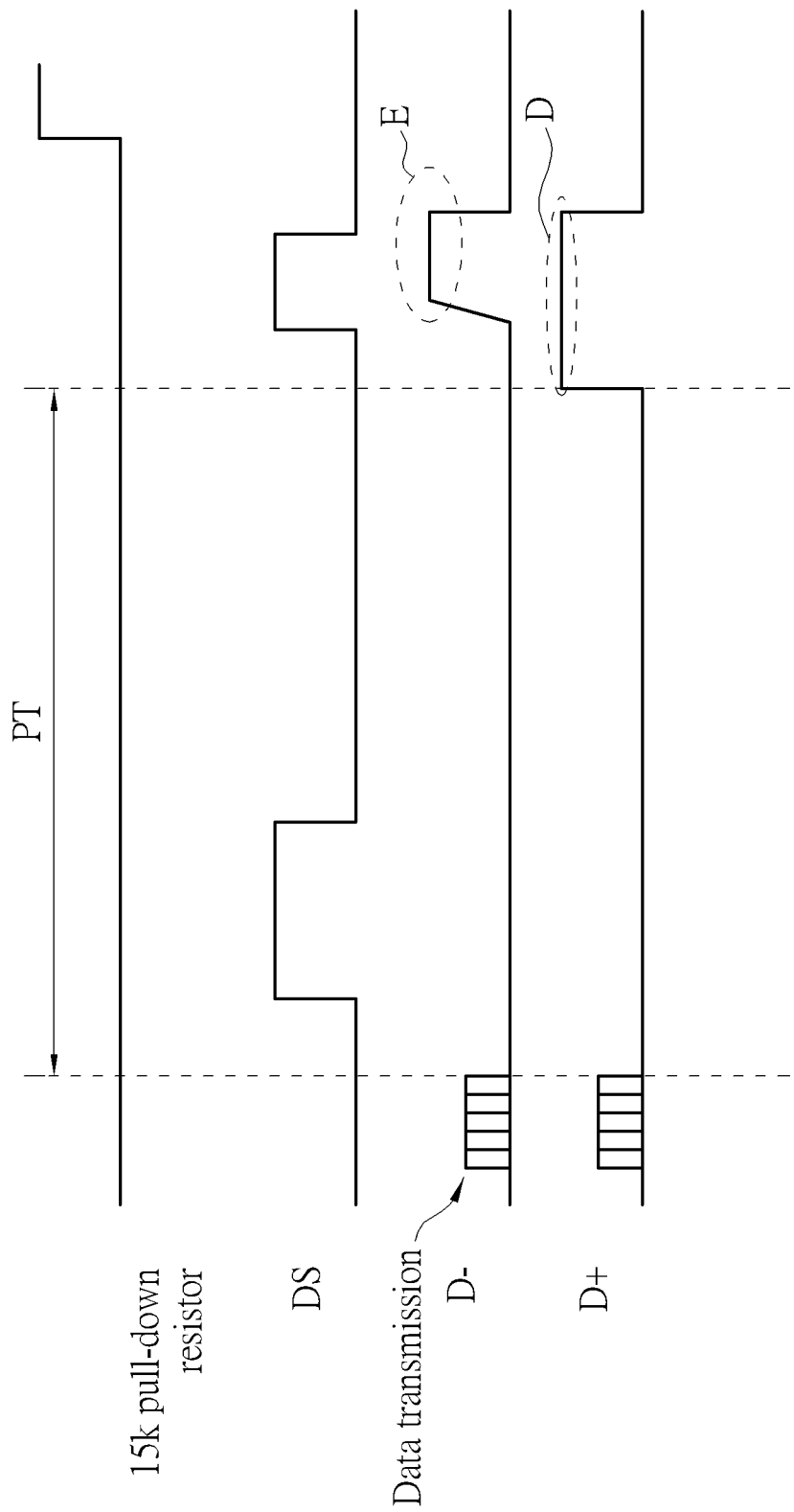

Please refer to FIGS. 4-6. FIG. 4 is a diagram illustrating an extensible host controller 250 being connected to the host 200 through the extensible host controller 100 and the ordinary USB transmission line 230, and FIGS. 5, 6 are timing diagrams illustrating the extensible host controller 100 detecting the extensible host controller 250, wherein the extensible host controller 250 is applied to a second host 260, and the second host 260 further includes a memory 402. As shown in FIG. 5, at a time point TP1, the control unit 104 of the extensible host controller 100 first disables a 15K pull-down resistor coupled to a data transmission line D− of the extensible host controller 100 (wherein the data transmission line D− and the 15K pull-down resistor are not shown in FIG. 4, and a definition of the data transmission line D− is shown in the USB 2.0 standard specification, so further description thereof is omitted for simplicity) for a period T1 to detect whether potential of the data transmission line D− is at a high voltage. During the period T1, the control unit 104 can enable a signal DS for detecting the potential of the data transmission line D−. If the extensible host controller 250 is not connected to the host 200, the potential of the data transmission line D− is at the high voltage (a dashed circle A shown in FIG. 5), so the control unit 104 can disable the 15K pull-down resistor coupled to the data transmission line D− of the extensible host controller 100 to detect whether the potential of the data transmission line D− is at the high voltage again at a time point TP2 shown in FIG. 5.

After the time point TP2, because the control unit 104 can enable the signal DS for detecting the potential of the data transmission line D−, if the extensible host controller 250 is a USB 2.0 extensible host controller and connected to the host 200, the potential of the data transmission line D− is at a low voltage (a dashed circle B shown in FIG. 5), and the control unit 104 can determine that the second host 260 is a USB host accordingly. That is to say, the host 200 can act as a target side and the second host 260 can act as a host side). After the host 200 is determined as the target side and the second host 260 is determined as the host side, the control unit 104 enables a 1.5K pull-up resistor coupled to a data transmission line D+ of the extensible host controller 100 at a time point TP3 after the signal DS is disabled (wherein the data transmission line D+ and the 1.5K pull-up resistor are not shown in FIG. 4, and a definition of the data transmission line D+ can be referred to the USB 2.0 standard specification, so further description thereof is omitted for simplicity). After the 1.5K pull-up resistor coupled to the data transmission line D+ of the extensible host controller 100 is enabled (a potential of the data transmission line D+ is at the high voltage (a dashed circle C shown in FIG. 5), the second host 260 can issue third requests TR to the extensible host controller 100 through the extensible host controller 250. According to the USB 3.0 compatible standard specification (e.g. the USB 3.0 and other USB 3.1 compatible standard specification), because the extensible host controller 100 has the debug capability unit (that is, the predetermined unit 1024), when the second host 260 issues the third requests TR to the extensible host controller 100, the predetermined driver built in the control unit 104 can drive the predetermined unit 1024 to respond to the third requests TR. In addition, after the predetermined unit 1024 responds to the third requests TR, subsequent operational principles of the host 200, second host 260, and the control unit 104 are the same as those of the host 200, the first host 240, and the control unit 104 shown in FIG. 3, so further description thereof is omitted for simplicity.

In addition, as shown in FIG. 6, if no data transmission between the host 200 and the second host 260 exceeds a predetermined time PT, the control unit 104 can make the host 200 enter a suspend mode (that is, the control unit 104 starts to enable the 1.5 K pull-up resistor coupled to the data transmission line D+ of the extensible host controller 100 at a dashed circle D shown in FIG. 6). After the 1.5K pull-up resistor starts to be enabled, the control unit 104 can enabled the signal DS for detecting the potential of the data transmission line D−. If the extensible host controller 250 is disconnected form the host 200, the potential of the data transmission line D− is at the high voltage (a dashed circle E shown in FIG. 6); and if the extensible host controller 250 is still connected to the host 200, the potential of the data transmission line D− is still at the low voltage, that is, the host 200 is still at the suspend mode. In addition, the present invention is not limited to the high voltage and the low voltage of the data transmission line D− being equal to the high voltage and the low voltage of the data transmission line D+.

Figure 7:
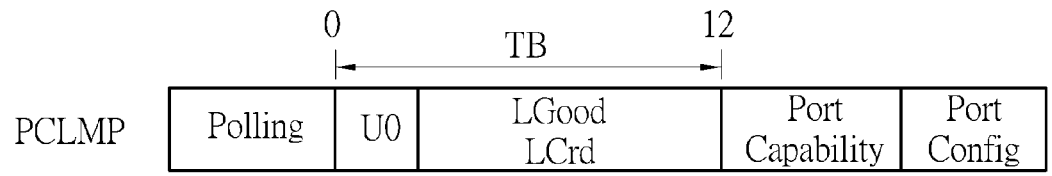
FIG. 7 is a diagram illustrating the tiebreaker value being greater than the first tiebreaker value.
Figure 7:
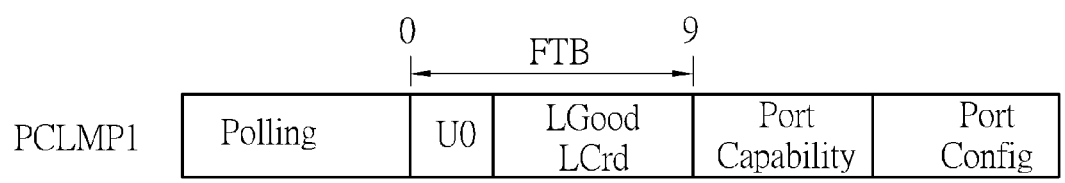
Figure 8:
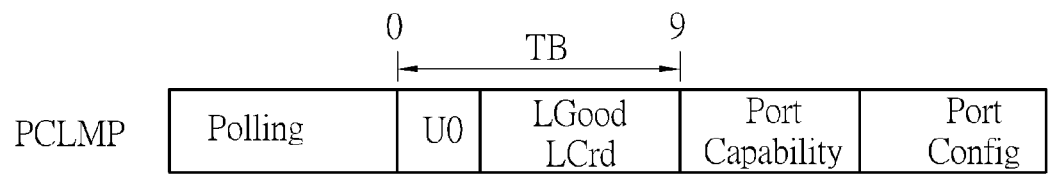
FIG. 8 is a diagram illustrating the tiebreaker value being less than the first tiebreaker value.
Figure 8:
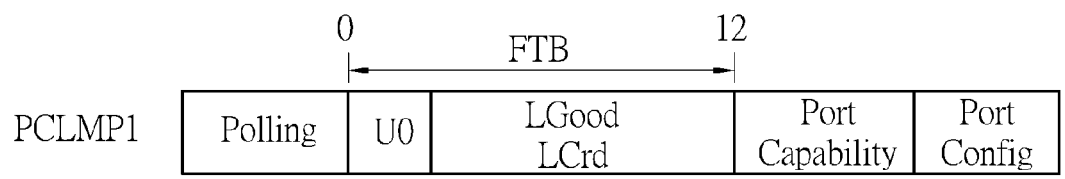

However, if the extensible host controller 250 is a USB 3.0 compatible extensible host controller and connected to the host 200, the control unit 104 can detect a tiebreaker value TB corresponding to a port capability link management protocol PCLMP issued by the extensible host controller 100 and a first tiebreaker value FTB corresponding to a port capability link management protocol PCLMP1 issued by the extensible host controller 250 during a handshaking between the extensible host controller 100 and the extensible host controller 250 when a link between the extensible host controller 100 and the extensible host controller 250 is at an active (U0) period, wherein the tiebreaker value TB and the first tiebreaker value FTB are random and increased with time. When the tiebreaker value TB is greater than the first tiebreaker value FTB (e.g. as shown in FIG. 7, the tiebreaker value TB is 12 and the first tiebreaker value FTB is 9), the control unit 104 determines that the extensible host controller 100 is a USB peripheral device, and the host 200 utilizes the predetermined mode and the predetermined unit 1024 to communicate with the extensible host controller 250; when the first tiebreaker value FTB is greater than the tiebreaker value TB (e.g. as shown in FIG. 8, the tiebreaker value TB is 9 and the first tiebreaker value FTB is 12), the control unit 104 determines that extensible host controller 100 is a USB host, and the host 200 utilizes the USB mode and the USB unit 1022 to communicate with the extensible host controller 250; and when the first tiebreaker value FTB is equal to the tiebreaker value TB, the extensible host controller 100 and the extensible host controller 250 execute the handshaking again until the tiebreaker value TB is greater than the first tiebreaker value FTB, or the tiebreaker value TB is less than the first tiebreaker value FTB.

But, in another embodiment of the present invention, when the tiebreaker value TB is greater than the first tiebreaker value FTB, the control unit 104 determines that the extensible host controller 100 is a USB host, and the host 200 utilizes the USB mode and the USB unit 1022 to communicate with the extensible host controller 250; and when the first tiebreaker value FTB is greater than the tiebreaker value TB, the control unit 104 determines that the extensible host controller 100 is a USB peripheral device, and the host 200 utilizes the predetermined mode and the predetermined unit 1024 to communicate with the extensible host controller 250. In addition, definitions corresponding to Polling, U0, LGood, LCrd, Port capability, and Port Config shown in FIGS. 7, 8 are shown in the USB 3.0 compatible standard specification, so further description thereof is omitted for simplicity.

Figure 9:
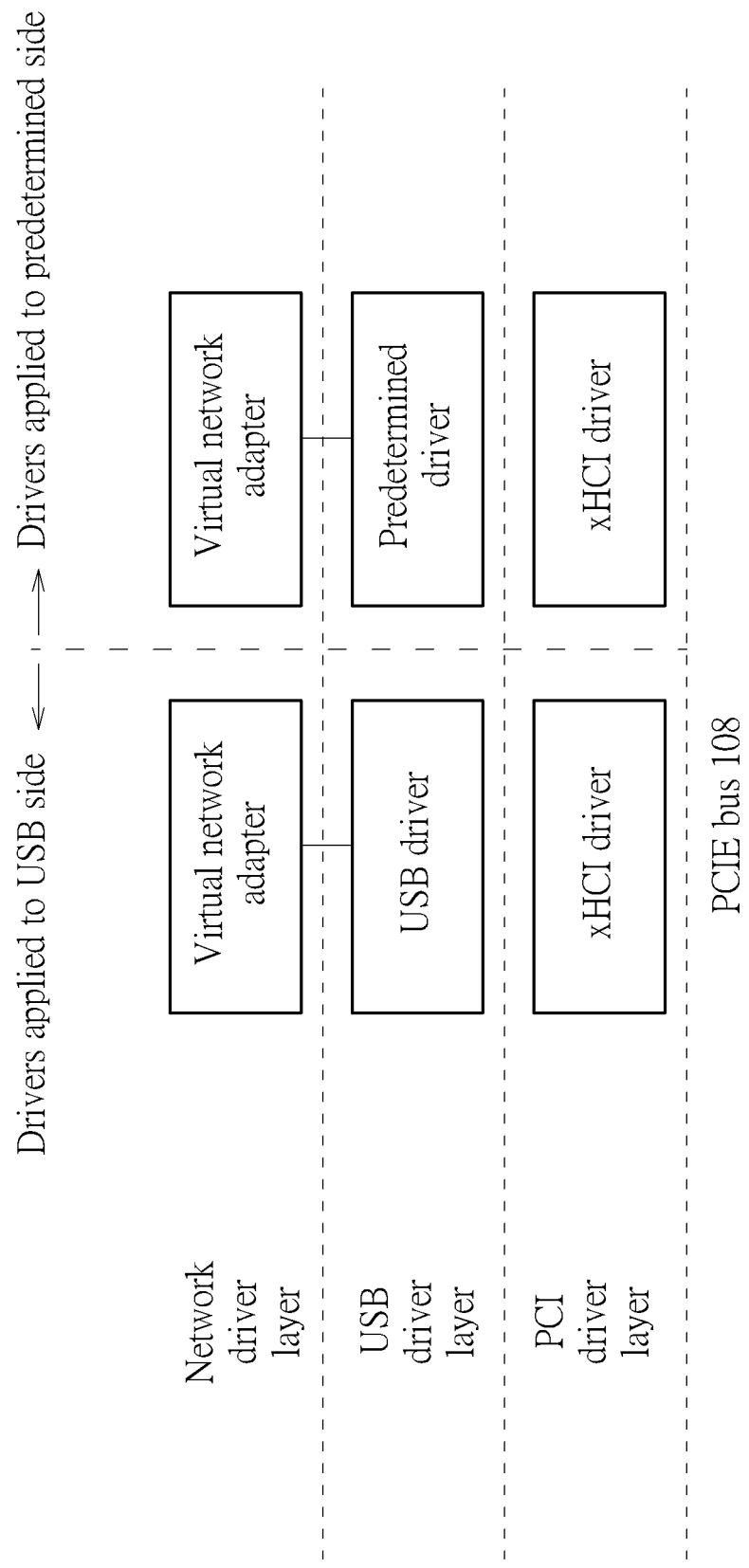
FIG. 9 is a diagram illustrating a data structure built in the control unit corresponding to the USB device driver, the xHCI driver, the predetermined driver, and the virtual network adapter applied to the extensible host controller.

Please refer to FIG. 9. FIG. 9 is a diagram illustrating a data structure built in the control unit 104 corresponding to the USB device driver, the xHCI driver, the predetermined driver, and the virtual network adapter applied to the extensible host controller 100. As shown in FIG. 9, the data structure includes drivers applied to a USB side (the USB device driver, the xHCI driver, and the virtual network adapter) and drivers applied to a predetermined side (the xHCI driver, the predetermined driver, and the virtual network adapter). When the USB peripheral device 220 is connected to the host 200, the control unit 104 utilizes the drivers applied to the USB side shown in FIG. 9 to drive corresponding hardware (e.g. the xHC interface 106, the USB unit 1022, and the USB physical layer 101) of the extensible host controller 100; and when the first host 240 is connected to the host 200, the control unit 104 utilizes the drivers applied to the predetermined side shown in FIG. 9 to drive corresponding hardware (e.g. the xHC interface 106, the predetermined unit 1024 (the debug capability unit), and the USB physical layer 101) of the extensible host controller 100.

Figure 10:
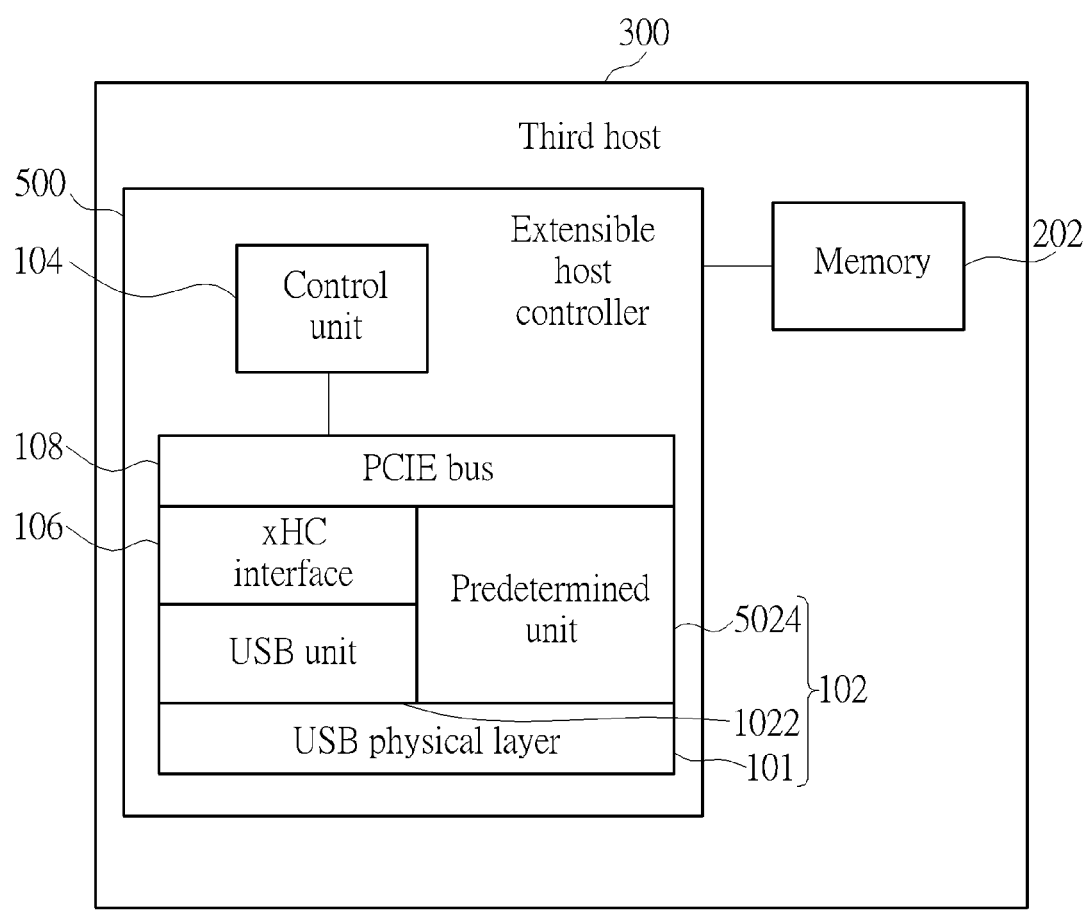
FIG. 10 is a diagram illustrating an extensible host controller according to a second embodiment of the present invention.

Please refer to FIG. 10. FIG. 10 is a diagram illustrating an extensible host controller 500 according to a second embodiment of the present invention, wherein the extensible host controller 500 is applied to a third host 300. As shown in FIG. 10, a difference between the extensible host controller 500 and the extensible host controller 100 is that a predetermined unit 5024 of the extensible host controller 500 is directly coupled to the PCIE bus 108. Therefore, when a fourth host (a USB host not shown in FIG. 10) is connected to the third host 300 through the extensible host controller 500 and the ordinary USB transmission line 230, the fourth host can utilize the network package way to transmit data to the memory 202 of the third host 300 through the ordinary USB transmission line 230, the USB physical layer 101, the predetermined unit 5024, and the PCIE bus 108. In addition, the third host 300 can also transmit data stored in the memory 202 to the fourth host through the ordinary USB transmission line 230, the USB physical layer 101, the predetermined unit 5024, and the PCIE bus 108. In addition, subsequent operational principles of the extensible host controller 500 are the same as those of the extensible host controller 100, so further description thereof is omitted for simplicity.

Figure 11:
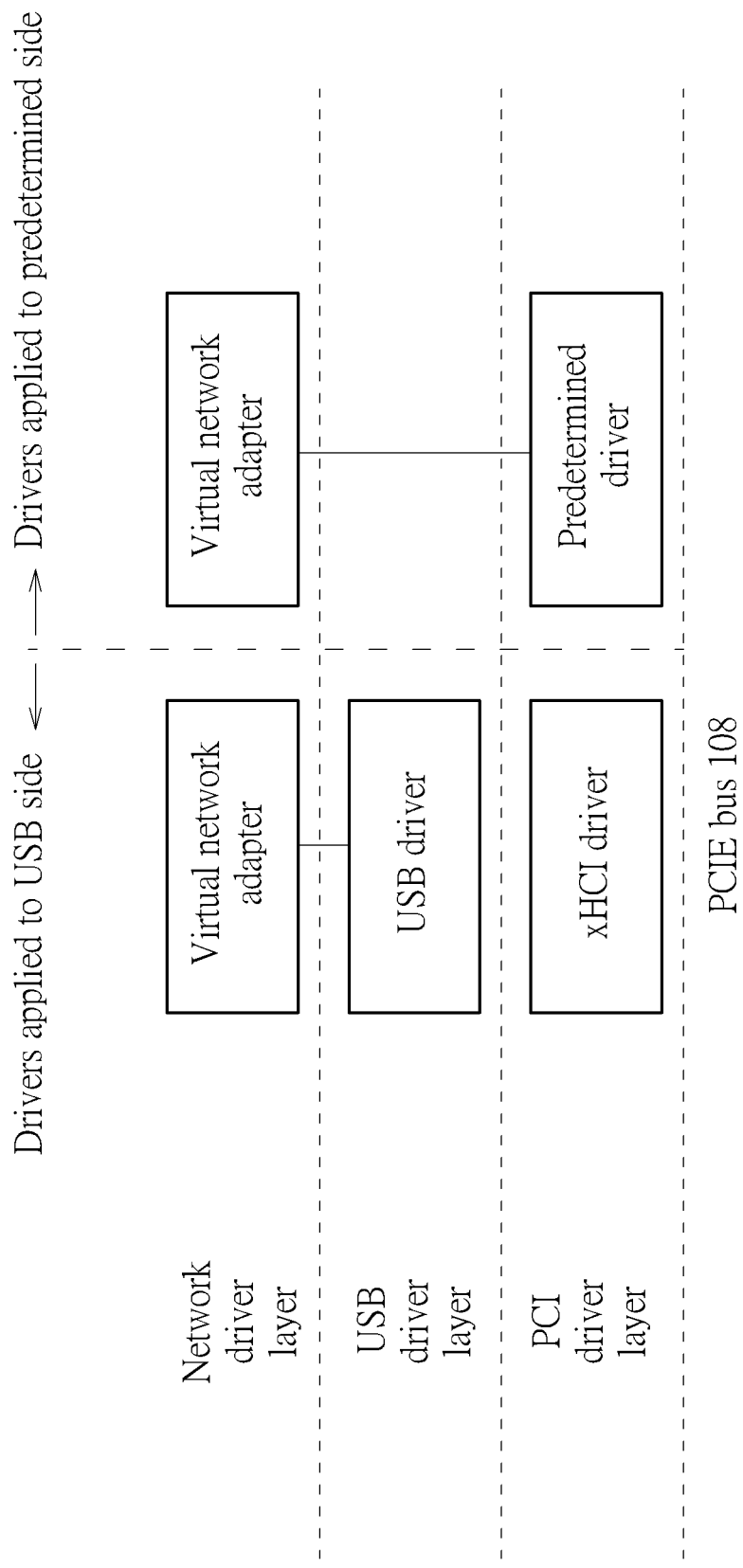
FIG. 11 is a diagram illustrating a data structure built in the control unit corresponding to the USB device driver, the xHCI driver, the predetermined driver, and the virtual network adapter applied to the extensible host controller.

Please refer to FIG. 11. FIG. 11 is a diagram illustrating a data structure built in the control unit 104 corresponding to the USB device driver, the xHCI driver, the predetermined driver, and the virtual network adapter applied to the extensible host controller 500. As shown in FIG. 11, the data structure also includes drivers applied to a USB side (the USB device driver, the xHCI driver, and the virtual network adapter) and drivers applied to a predetermined side (the predetermined driver, and the virtual network adapter). When a USB peripheral device is connected to the third host 300, the control unit 104 of the extensible host controller 500 utilizes the drivers applied to the USB side in FIG. 11 to drive corresponding hardware (e.g. the xHC interface 106, the USB unit 1022, and the USB physical layer 101) of the extensible host controller 500; and when the fourth host is connected to the third host 300, the control unit 104 utilizes the drivers applied to the predetermined side in FIG. 11 to drive corresponding hardware (e.g. the predetermined unit 5024 (the debug capability unit), and the USB physical layer 101) of the extensible host controller 500.

Figure 12:
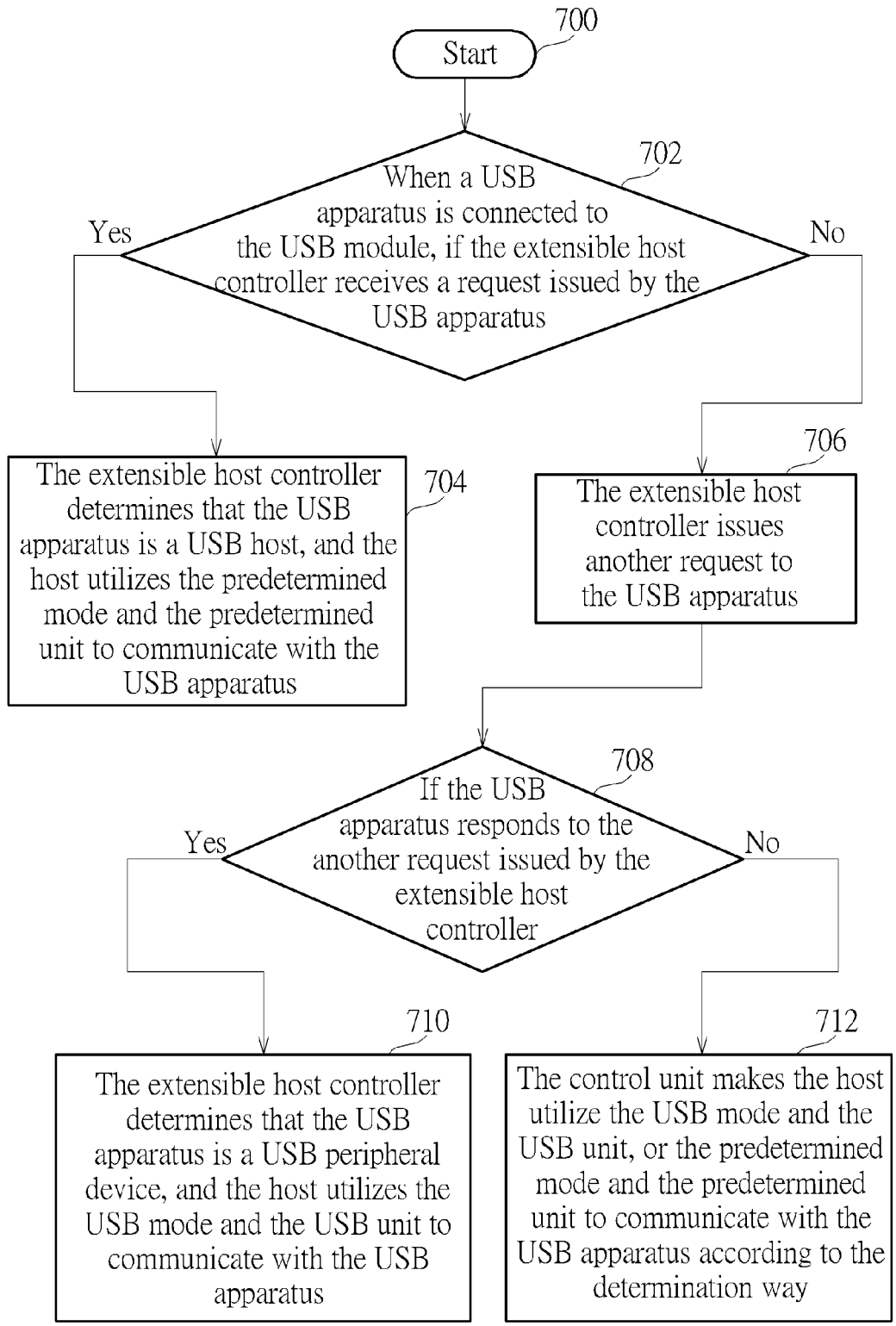
FIG. 12 is a flowchart illustrating an operation method of an extensible host controller according to a third embodiment of the present invention.

Please refer to FIGS. 1-8, 12. FIG. 12 is a flowchart illustrating an operation method of an extensible host controller according to a third embodiment of the present invention. The operation method in FIG. 12 is illustrated using the extensible host controller 100 in FIG. 1. Detailed steps are as follows:

Step 700: Start.

Step 702: When a USB apparatus is connected to the USB module 102, if the extensible host controller 100 receives a request issued by the USB apparatus; if yes, go to Step 704; if no, go to Step 706.

Step 704: The extensible host controller 100 determines that the USB apparatus is a USB host, and the host 200 utilizes the predetermined mode and the predetermined unit 1024 to communicate with the USB apparatus.

Step 706: The extensible host controller 100 issues another request to the USB apparatus.

Step 708: If the USB apparatus responds to the another request issued by the extensible host controller 100; if yes, go to Step 710; if no, go to Step 712.

Step 710: The extensible host controller 100 determines that the USB apparatus is a USB peripheral device, and the host 200 utilizes the USB mode and the USB unit 1022 to communicate with the USB apparatus.

Step 712: The control unit 104 makes the host 200 utilize the USB mode and the USB unit 1022, or the predetermined mode and the predetermined unit 1024 to communicate with the USB apparatus according to the determination way.

In Step 704, as shown in FIG. 3, when the first host 240 (that is, the USB apparatus) is connected to the host 200, the control unit 104 of the extensible host controller 100 can determine that the first host 240 is a USB host (because the first host 240 can issue the second requests SR to the extensible host controller 100). Because the extensible host controller 100 has the debug capability unit (that is, the predetermined unit 1024), after the predetermined unit 1024 responds to the second requests SR, the host 200 can utilize the predetermined mode (that is, the local area network mode) to communicate with the first host 240. For example, when the first host 240 is connected to the host 200, the control unit 104 can utilize the virtual network adapter (e.g. the 5 Gb Ethernet network driver built in the control unit 104) to simulate the Ethernet environment, so the first host 240 can utilize the network package way to transmit data to the memory 202 of the host 200 through the ordinary USB transmission line 230, the USB physical layer 101, the predetermined unit 1024, the xHC interface 106, and the PCIE bus 108. In addition, the host 200 can also utilize the network package way to transmit data stored in the memory 202 to the first host 240 through the ordinary USB transmission line 230, the USB physical layer 101, the predetermined unit 1024, the xHC interface 106, and the PCIE bus 108. In addition, when the first host 240 is connected to the host 200, the present invention is not limited to the first host 240 utilizing the network package way to communicate with the host 200. That is to say, when the first host 240 is connected to the host 200, the control unit 104 can utilize another driver to build a data transmission environment to let the first host 240 utilize another data transmission way to communicate with the host 200.

In Step 706, after the extensible host controller 100 does not receive the request issued by the USB apparatus, the extensible host controller 100 issues the another request to the USB apparatus. In Step 710, as shown in FIG. 2, when the USB peripheral device 220 is connected to the host 200 through the extensible host controller 100 and the ordinary USB transmission line 230, because the USB peripheral device 220 does not issue any request to the extensible host controller 100, but the USB peripheral device 220 can respond to the another request issued by the extensible host controller 100, so the extensible host controller 100 can act as a master role and the USB peripheral device 220 can act as a slave role. Therefore, the USB device driver built in the control unit 104 can ask the xHCI driver built in the control unit 104 to drive the xHC interface 106 to issue the first requests FR to the USB peripheral device 220. After the USB peripheral device 220 responds to the first requests FR, the host 200 can utilize the USB mode to communicate with the USB peripheral device 220.

In Step 712, as shown in FIG. 5, at a time point TP1, the control unit 104 of the extensible host controller 100 first disables the 15K pull-down resistor coupled to the data transmission line D− of the extensible host controller 100 for the period T1 to detect whether the potential of the data transmission line D− is at the high voltage. During the period T1, the control unit 104 can enable the signal DS for detecting the potential of the data transmission line D−. If the extensible host controller 250 is not connected to the host 200, the potential of the data transmission line D− is at the high voltage (the dashed circle A shown in FIG. 5), so the control unit 104 can disable the 15K pull-down resistor coupled to the data transmission line D− of the extensible host controller 100 to detect whether the potential of the data transmission line D− is at the high voltage again at the time point TP2 shown in FIG. 5.

After the time point TP2, because the control unit 104 can enable the signal DS for detecting the potential of the data transmission line D−, if the extensible host controller 250 is a USB 2.0 extensible host controller and connected to the host 200, the potential of the data transmission line D− is at the low voltage (the dashed circle B shown in FIG. 5), and meanwhile, the host 200 can act as the target side and the second host 260 can act as the host side. After the host 200 is determined as the target side and the second host 260 is determined as the host side, the second host 260 can issue the third requests TR to the extensible host controller 100 through the extensible host controller 250. Because the extensible host controller 100 has the debug capability unit (that is, the predetermined unit 1024), when the second host 260 issues the third requests TR to the extensible host controller 100, the predetermined driver built in the control unit 104 can drive the predetermined unit 1024 to respond to the third requests TR. In addition, after the predetermined unit 1024 responds to the third requests TR, subsequent operational principles of the host 200, second host 260, and the control unit 104 are the same as those of the host 200, the first host 240, and the control unit 104 shown in FIG. 3, so further description thereof is omitted for simplicity.

In addition, as shown in FIG. 6, if no data transmission between the host 200 and the second host 260 exceeds the predetermined time PT, the control unit 104 can make the host 200 enter the suspend mode. That is to say, the control unit 104 enables the 1.5K pull-up resistor coupled to the data transmission line D+ of the extensible host controller 100 (the dashed circle D shown in FIG. 6). After the 1.5K pull-up resistor is enabled, the control unit 104 can enabled the signal DS for detecting the potential of the data transmission line D−. If the extensible host controller 250 is disconnected form the host 200, the potential of the data transmission line D− is at the high voltage (the dashed circle E shown in FIG. 6); and if the extensible host controller 250 is still connected to the host 200, the potential of the data transmission line D− is still at the low voltage, that is, the host 200 is still at the suspend mode.

In Step 712, however, if the extensible host controller 250 is a USB 3.0 compatible extensible host controller and connected to the host 200, the control unit 104 can detect the tiebreaker value TB corresponding to the port capability link management protocol PCLMP issued by the extensible host controller 100 and the first tiebreaker value FTB corresponding to the port capability link management protocol PCLMP1 issued by the extensible host controller 250 during the handshaking between the extensible host controller 100 and the extensible host controller 250 when the link between the extensible host controller 100 and the extensible host controller 250 is at the active (U0) period, wherein the tiebreaker value TB and the first tiebreaker value FTB are random and increased with time. When the tiebreaker value TB is greater than the first tiebreaker value FTB (e.g. as shown in FIG. 7, the tiebreaker value TB is 12 and the first tiebreaker value FTB is 9), the control unit 104 determines that the extensible host controller 100 is a USB peripheral device, and the host 200 utilizes the predetermined mode and the predetermined unit 1024 to communicate with the extensible host controller 250; when the first tiebreaker value FTB is greater than the tiebreaker value TB (e.g. as shown in FIG. 8, the tiebreaker value TB is 9 and the first tiebreaker value FTB is 12), the control unit 104 determines that extensible host controller 100 is a USB host, and the host 200 utilizes the USB mode and the USB unit 1022 to communicate with the extensible host controller 250; and when the first tiebreaker value FTB is equal to the tiebreaker value TB, the extensible host controller 100 and the extensible host controller 250 execute the handshaking again until the tiebreaker value TB is greater than the first tiebreaker value FTB, or the tiebreaker value TB is less than the first tiebreaker value FTB.

But, in another embodiment of the present invention, when the tiebreaker value TB is greater than the first tiebreaker value FTB, the control unit 104 determines that the extensible host controller 100 is a USB host, and the host 200 utilizes the USB mode and the USB unit 1022 to communicate with the extensible host controller 250; and when the first tiebreaker value FTB is greater than the tiebreaker value TB, the control unit 104 determines that the extensible host controller 100 is a USB peripheral device, and the host 200 utilizes the predetermined mode and the predetermined unit 1024 to communicate with the extensible host controller 250.

To sum up, because the extensible host controller and the operation method thereof can utilize the debug capability unit to respond requests issued from another USB host when the another USB host is connected to the extensible host controller, the extensible host controller and the operation method can directly utilize the ordinary USB transmission line to execute data transmission between the extensible host controller and the another USB host. Therefore, compared to the prior art, because the present invention can directly utilize the ordinary USB transmission line to execute data transmission between the extensible host controller and the another USB host, the present invention does not need an expensive intermediate bridge device to execute data transmission between the extensible host controller and the another USB host. In addition, data transmission performance of the present invention is better than the prior art due to direct data transmission between the extensible host controller and the another USB host.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An extensible host controller (xHC), wherein the extensible host controller is applied to a host, the extensible host controller comprising:
   a universal serial bus (USB) module, wherein the USB module comprises a USB unit and a network transmission unit;
   a control unit; and
   a peripheral component interconnect express (PCIE) bus coupled to the control unit, wherein the PCIE bus supports a USB mode and a network transmission mode;
   wherein when a first host with a first extensible host controller is connected to the USB module, the control unit makes the host utilize the network transmission mode and the network transmission unit to communicate with the first host according to USB 2.0 standard specifications, or makes the host optionally utilize the USB mode and the USB unit, or the network transmission mode and the network transmission unit to communicate with the first host according to USB 3.0 compatible standard specifications;
   wherein when a USB peripheral device is connected to the USB module, the host utilizes the USB mode and the USB unit to communicate with the USB peripheral device; and when a USB host is connected to the USB module, the host utilizes the network transmission mode and the network transmission unit to communicate with the USB host.

2. The extensible host controller of claim 1, further comprising:
   an xHC interface coupled between the USB unit and the PCIE bus.

3. The extensible host controller of claim 2, wherein the network transmission unit is coupled to the xHC interface.

4. The extensible host controller of claim 1, wherein the network transmission unit is directly coupled to the PCIE bus.

5. The extensible host controller of claim 1, wherein the network transmission mode is a local area network mode.

6. The extensible host controller of claim 1, wherein the USB module supports USB 1.0, USB 1.1, USB 2.0, USB 3.0, and other USB 3.1 compatible standard specifications.

7. The extensible host controller of claim 1, wherein the network transmission unit is a debug capability unit.

8. The extensible host controller of claim 1, wherein when the first extensible host controller is a USB 2.0 extensible host controller, the control unit making the host utilize the network transmission mode and the network transmission unit to communicate with the first host according to the USB 2.0 standard specifications comprises:
   the control unit disabling a pull-down resistor coupled to a data transmission line D− of the extensible host controller to detect whether potential of the data transmission line D− is a high voltage, wherein when the potential of the data transmission line D− is a low voltage, the control unit determines that the first host is a USB host, and the host utilizes the network transmission mode and the network transmission unit to communicate with the first host.

9. The extensible host controller of claim 8, wherein when the potential of the data transmission line D− is the high voltage, the control unit disables the pull-down resistor coupled to the data transmission line D− again to detect whether the potential of the data transmission line D− is the high voltage.

10. The extensible host controller of claim 1, wherein when the first extensible host controller is a USB 3.0 compatible extensible host controller, the control unit making the host optionally utilize the USB mode and the USB unit, or the network transmission mode and the network transmission unit to communicate with the first host according to USB 3.0 compatible standard specifications—comprises:
    the control unit detecting a tiebreaker value corresponding to a port capability link management protocol issued by the extensible host controller and a first tiebreaker value corresponding to a port capability link management protocol issued by the first extensible host controller during a handshaking between the extensible host controller and the first extensible host controller when a link between the extensible host controller and the first extensible host controller is at an active (U0) period;
    wherein when the tiebreaker value is greater than the first tiebreaker value, the control unit determines that the extensible host controller is USB peripheral device, and the host utilizes the network transmission mode and the network transmission unit to communicate with the first host; when the first tiebreaker value is greater than the tiebreaker value, the control unit determines that the extensible host controller is a USB host, and the host utilizes the USB mode and the USB unit to communicate with the first host; and when the first tiebreaker value is equal to the tiebreaker value, the extensible host controller and the first extensible host controller execute the handshaking again.

11. An operation method of an extensible host controller, wherein the extensible host controller is applied to a host, and comprises a universal serial bus (USB) module, a control unit, and a peripheral component interconnect express (PCIE) bus, wherein the USB module comprises a USB unit and a network transmission unit, and the PCIE bus supports a USB mode and a network transmission mode, the operation method comprising:
    if the extensible host controller receiving first requests from a USB apparatus when the USB apparatus is connected to the USB module;
    the extensible host controller determining the USB apparatus is a USB host, and the host utilizing the network transmission mode and the network transmission unit to communicate with the USB apparatus when the extensible host controller receives the first requests;
    the extensible host controller issuing second requests to the USB apparatus when the extensible host controller does not receive the first requests;
    the extensible host controller determining the USB apparatus is a USB peripheral device, and the host utilizing the USB mode and the USB unit to communicate with the USB apparatus when the USB apparatus responds to the second requests; and
    the control unit making the host utilize the network transmission mode and the network transmission unit to communicate with the USB apparatus according to USB 2.0 standard specifications, or making the host optionally utilize the USB mode and the USB unit, or the network transmission mode and the network transmission unit to communicate with the USB apparatus according to USB 3.0 compatible standard specifications when the USB apparatus does not respond to the second requests.

12. The operation method of claim 11, wherein the network transmission mode is a local area network mode.

13. The operation method of claim 11, wherein the USB module supports USB 1.0, USB 1.1, USB 2.0, USB 3.0, and other USB 3.1 compatible standard specifications.

14. The operation method of claim 11, wherein the network transmission unit is a debug capability unit.

15. The operation method of claim 11, wherein when the USB apparatus has a USB 2.0 first extensible host controller, the control unit making the host utilize the network transmission mode and the network transmission unit to communicate with the USB apparatus according to the USB 2.0 standard specifications comprises:

the control unit disabling a pull-down resistor coupled to a data transmission line D− of the extensible host controller to detect whether potential of the data transmission line D− is a high voltage; and the control unit determining that the first host is a USB host, and the host utilizing the network transmission mode and the network transmission unit to communicate with the first host when the potential of the data transmission line D− is a low voltage.

16. The operation method of claim 15, wherein the control unit making the host utilize the network transmission mode and the network transmission unit to communicate with the USB apparatus according to the USB 2.0 standard specifications further comprises:

the control unit disabling the pull-down resistor coupled to the data transmission line D− again to detect whether the potential of the data transmission line D− is the high voltage when the potential of the data transmission line D− is the high voltage.

17. The operation method of claim 11, wherein when the USB apparatus has a USB 3.0 compatible extensible host controller, the control unit making the host optionally utilize the USB mode and the USB unit, or the network transmission mode and the network transmission unit to communicate with the USB apparatus according to the USB 3.0 compatible standard specifications comprises:

the control unit detecting a tiebreaker value corresponding to a port capability link management protocol issued by the extensible host controller and a first tiebreaker value corresponding to a port capability link management protocol issued by the first extensible host controller during a handshaking between the extensible host controller and the first extensible host controller when a link between the extensible host controller and the first extensible host controller is at an active period;

the control unit determining that the extensible host controller is a USB peripheral device, and the host utilizing the network transmission mode and the network transmission unit to communicate with the first host when the tiebreaker value is greater than the first tiebreaker value;

the control unit determining that the extensible host controller is a USB host, and the host utilizing the USB mode and the USB unit to communicate with the first host when the first tiebreaker value is greater than the tiebreaker value; and the extensible host controller and the first extensible host controller executing the handshaking again when the first tiebreaker value is equal to the tiebreaker value.

18. An extensible host controller, wherein the extensible host controller is applied to a host, the extensible host controller comprising:

a universal serial bus (USB) module, wherein the USB module comprises a USB unit and a network transmission unit;

a control unit; and a peripheral component interconnect express (PCIE) bus coupled to the control unit, wherein the PCIE bus supports a USB mode and a network transmission mode;

wherein when one of a first host with a first extensible host controller, a USB peripheral device, or a USB host is connected to the USB module, the control unit makes the host utilize the network transmission mode and the network transmission unit to communicate with the one according to USB 2.0 standard specifications, or making the host optionally utilize the USB mode and the USB unit, or the network transmission mode and the network transmission unit to communicate with the one according to USB 3.0 compatible standard specifications;

wherein when the USB peripheral device is connected to the USB module, the control unit makes the host utilize the USB mode and the USB unit to communicate with the USB peripheral device.

19. The extensible host controller of claim 18, wherein when the USB host is connected to the USB module, the control unit makes the host utilize the network transmission mode and the network transmission unit to communicate with the USB host.

20. The extensible host controller of claim 18, wherein when the first extensible host controller is a USB 2.0 extensible host controller, the control unit makes the host utilize the network transmission mode and the network transmission unit to communicate with the first host.

21. The extensible host controller of claim 18, wherein when the first extensible host controller is a USB 3.0 compatible extensible host controller, the control unit determines to make the host optionally utilize the network transmission mode and the network transmission unit, or the USB mode and the USB unit to communicate with the first host according to a tiebreaker value corresponding to a port capability link management protocol issued by the extensible host controller and a first tiebreaker value corresponding to a port capability link management protocol issued by the first extensible host controller during an active period.

22. The extensible host controller of claim 18, wherein the network transmission unit is a debug capability unit.

23. An extensible host controller applied to a host, when one of a first host with a first extensible host controller, a universal serial bus (USB) peripheral device, or a USB host is connected to the host, the extensible host controller making the host act as a target side to utilize a network transmission mode and a network transmission unit comprised in the extensible host controller to communicate with the one according to USB 2.0 standard specifications, or optionally making the host act as the target side to utilize the network transmission mode and the network transmission unit to communicate with the one or act as a host side to utilize a USB mode and a USB unit comprised in the extensible host controller to communicate with the one according to USB 3.0 standard specifications, wherein when the USB peripheral device is connected to the host, the extensible host controller controls the host to act as the host side to communicate with the USB peripheral device.

24. The extensible host controller of claim 23, wherein when the USB host is connected to the USB module, the extensible host controller controls the host to act as the target side to communicate with the USB host.

25. The extensible host controller of claim 23, wherein when the first extensible host controller is a USB 2.0 extensible host controller, the extensible host controller controls the host to act as the target side to communicate with the first host.

26. The extensible host controller of claim 23, wherein when the first extensible host controller is a USB 3.0 compatible extensible host controller, the extensible host controller controls the host to act as the target side or the host side to communicate with the first host.

* * * * *